United States Patent [19]

Ionescu

[11] 4,095,688

[45] Jun. 20, 1978

[54] BOTTLE ORIENTING APPARATUS

[75] Inventor: Cristina S. Ionescu, Bronx, N.Y.

[73] Assignee: New England Machinery, Inc., Beardsley, Conn.

[21] Appl. No.: 700,749

[22] Filed: Jun. 29, 1976

Related U.S. Application Data

[63] Continuation-in-part of Ser. No. 665,726, Mar. 11, 1976, abandoned.

[51] Int. Cl.² ............................................. B65G 47/24
[52] U.S. Cl. .................................... 198/399; 198/383; 198/412
[58] Field of Search ............... 198/392, 398, 399, 400, 198/412; 193/45, 47, 48; 64/30 R, 30 C

[56] References Cited

U.S. PATENT DOCUMENTS

| | | | |
|---|---|---|---|
| 2,584,526 | 2/1952 | Albertoli | 198/400 X |
| 2,628,098 | 2/1953 | Bauerschmidt | 198/400 X |
| 2,725,971 | 12/1955 | Clark-Riede | 193/47 X |
| 3,105,371 | 10/1963 | Forrest | 64/30 C |
| 3,679,070 | 7/1972 | Skiba | 193/48 X |
| 3,682,292 | 8/1972 | Drew | 198/399 |
| 3,798,990 | 3/1974 | Knappe et al. | 64/30 C |

Primary Examiner—John J. Love
Assistant Examiner—Douglas D. Watts
Attorney, Agent, or Firm—Jack Posin

[57] ABSTRACT

Bottle orienting apparatus for orienting successively advancing bottles of shoulder-and-neck construction with at-random neck-leading and neck-trailing dispositions into a train of bottles of only neck-trailing disposition, is disclosed. The apparatus comprises a guide system for advancing the bottles in the at-random neck-leading and neck-trailing dispositions and a discriminating system for inverting each of the bottles of neck-leading disposition to a neck-trailing disposition, the guide system being upstream of and communicating with the discriminating system. Associated with the discriminating system is a system for accelerating the bottles away from the discriminating system toward a bottle processing station at which the bottles are filled or otherwise treated. The system for accelerating the bottles is so arranged as to pinch each of the bottles in succession laterally of the direction they are accelerated, thereby to exercise positive frictional control over the bottles when initiating acceleration of the latter.

24 Claims, 8 Drawing Figures

BOTTLE ORIENTING APPARATUS

REFERENCES TO RELATED APPLICATION

This is a continuation-in-part application of copending U.S. patent application Ser. No. 665,726 filed on Mar. 11, 1976.

The foregoing abstract is neither intended to define the invention disclosed in the specification, nor is it intended to limit the scope of the invention in any way.

BACKGROUND OF THE INVENTION

The present invention relates generally to a bottle-control system and, more particularly, to apparatus for aligning randomly oriented bottles of neck-leading and neck-trailing dispositions such that they are advanced to a bottle-collecting means all in a common neck-trailing disposition.

Pharmaceutical companies and other manufacturers sell millions of fluid-filled bottles yearly, such as medicine sprays and cleanser droplet-dischargers, and employ various mechanical devices to treat and fill the bottles with the appropriate contents as rapidly and effectively as possible. The bottles, in an empty condition, are usually simply randomly batched into a holding-tank or the like equipped with means for discharging the bottles one-by-one in succession at-random in neck-leading and neck-trailing dispositions to a conveyor. The conveyor advances the bottles through various stations at which the bottles are commonly oriented each first into a neck-trailing disposition and then into a neck-up disposition, and then cleaned or filled or otherwise treated preparatory to being packaged, stored and sold.

The present invention relates particularly to apparatus which operates upon bottles of shoulder-and neck construction, and includes means for discriminating between a bottle advancing in a neck-leading disposition from a bottle advancing in a neck-trailing disposition, the discriminating means functioning to invert those bottles of neck-leading disposition each to a neck trailing disposition.

A number of devices for discriminating between bottles of neck-leading disposition and bottles of neck-trailing disposition are already known in the art such as, for example, the respective devices disclosed in U.S. Pat. No. 3,339,702, issued on Sept. 5, 1967 to R. F. Novak et al., and U.S. Pat. No. 3,894,628, issued on July 15, 1975 to A. G. Pugh. The discriminating devices disclosed in these patents are capable of altering ("inverting") the disposition of those bottles of neck-leading disposition each to a neck-trailing disposition, and are associated with means for thereafter advancing each of the bottles in neck-trailing disposition to various processing stations at which the bottles are collected and treated.

The object of utilizing mechanical means to orient the bottles in succession, clearly, is to operate upon as many of the bottles as possible in the least amount of time. Each and every stage of manipulating the bottles is a potential means of lost time and must be as efficient as possible so as not to interfere with maximized output. Clearly, when a bottle of neck-leading disposition is in the process of being inverted from a neck-leading disposition to a neck-trailing disposition, there results a delay in the rate of advancement of bottles upstream of (behind) the one being inverted, thereby restricting the number of bottles that can be inverted and further advanced in a given allotment of time.

A disadvantage associated with the devices disclosed in the aforementioned U.S. patents is that the disclosed discriminating means for inverting the bottles is not associated with an efficient means for assisting it to rapidly eject and accelerate the bottles therefrom and enable the very next bottle immediately upstream thereof to be advanced thereto rapidly for similar manipulation. As a result, the entire bottle-manipulating process is not as efficient as it might otherwise be. It is just such a disadvantage that is overcome by the present invention.

SUMMARY OF THE INVENTION

Accordingly, it is an object of the present invention to provide an improved bottle orienting apparatus. Further objects of this invention are to provide bottle orienting apparatus having improved random bottle feed means, improved bottle discriminating means and improved bottle removal means.

The present invention includes what may be characterized as discriminating means for altering the disposition of each of the neck-leading bottles to respective neck-trailing dispositions, and accelerating means, cooperative with the discriminating means, for accelerating the bottles away from the discriminating means so as not to interfere with an upcoming bottle next to be manipulated or inverted by the discriminating means, which interference would otherwise slow down the entire bottle-advancing process.

Pursuant to the present invention, the accelerating means includes an arrangement for pinching (or squeezing) each of the bottles after each has been inverted, or otherwise manipulated, in order to exercise positive frictional control over each bottle in the course of its acceleration from the discriminating means. Pursuant to at least one embodiment of the present invention, the arrangement for pinching the bottles is in the form of a roller which is spaced radially from the discriminating means by a distance which is slightly less than the body-width of each of the bottles to, thereby, in cooperation with the discriminating means, slightly pinch the opposing walls of each bottle inwardly and, thus, with increased friction peripherally advance each bottle away from the discriminating means.

It will be understood that the process of "pinching" each of the bottles is one which is utilized with bottles which are flexible. However, the same concept can be maintained with bottles which are not flexible by utilizing an accelerating roller having a flexible periphery.

BRIEF DESCRIPTION OF THE DRAWINGS

While the specification concludes with claims which particularly point out and distinctly claim the subject matter regarded as the invention herein, it is believed that the invention will be better understood from the following description taken in conjunction with the accompanying drawings, in which:

DETAILED DESCRIPTION OF THE INVENTION

Overall Machine

Figure 1:
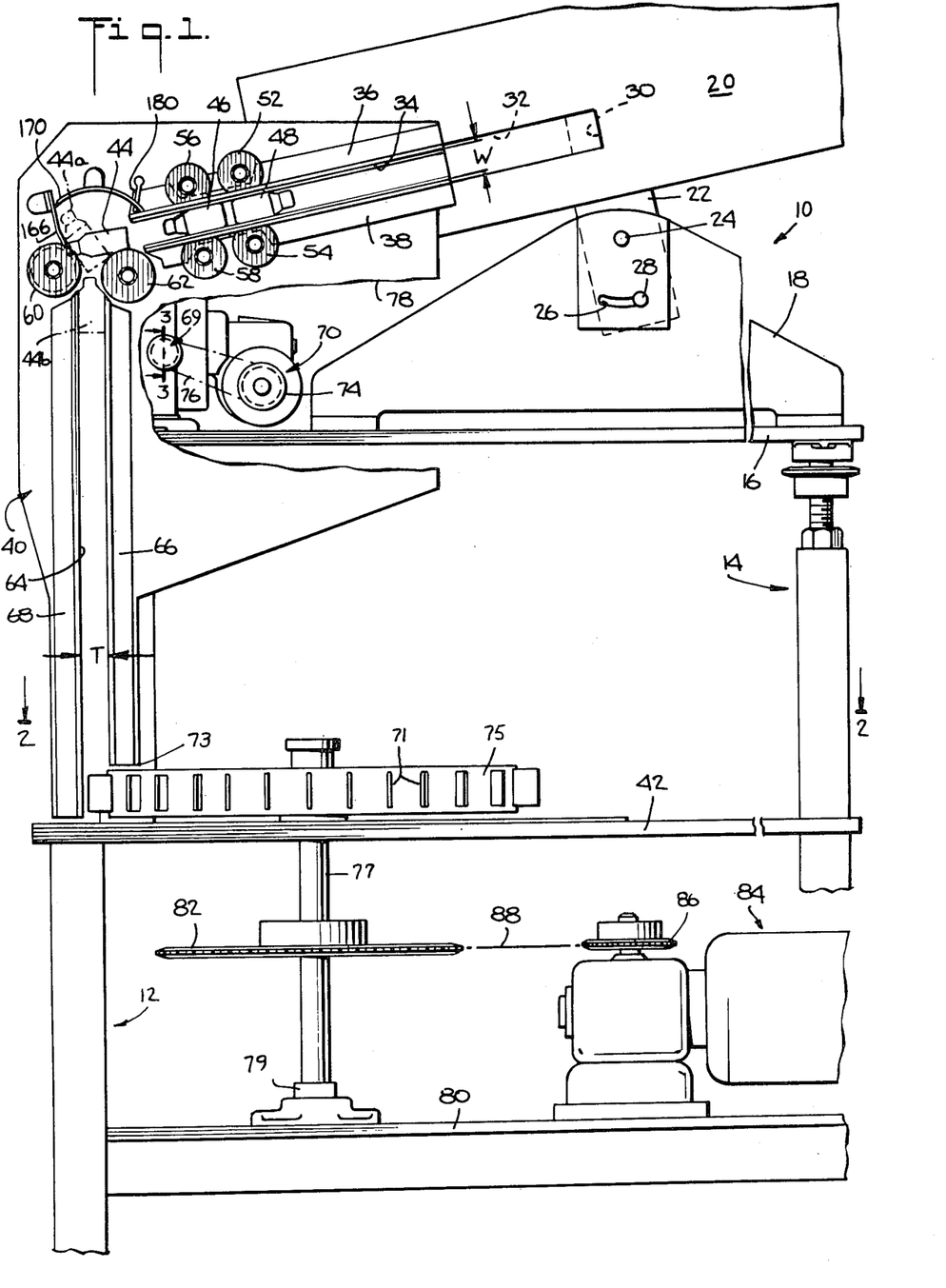
FIG. 1 is a fragmentary, front elevational view of an assembly in which is incorporated the apparatus pursuant to the present invention.

Referring now to the drawings, and more particularly to FIG. 1, there is illustrated a bottle-manipulating assembly denoted generally by the reference character 10. The assembly 10 includes a lower frame portion 12 and an upper frame portion 14 secured upon the frame portion 12. The upper frame portion 14 supports a platform 16 to which is secured an upstanding bracket 18. Pivotally connected to the bracket 18 is a bottle-containing or supply unit 20 having a base flange 22 which can be adjustably tilted about a pin 24 or the like interconnecting the base flange 22 to the bracket 18.

The angular orientation of the base flange 22 relative to the bracket 18 may be selectively fixed by means of a clamping screw 28 or the like which extends through an arcuate slot 26 formed in the bracket 18 and is threadedly constrained in a threaded aperture (not shown) formed in the base flange 22 behind the bracket 18. Thus, the orientation of the supply unit 20 can be altered from one of a horizontal disposition (not shown) to one of a tilted disposition as illustrated in FIG. 1.

The supply unit 20 may be, for example, a conventional tank-like device for containing a large number of plastic bottles randomly predisposed therein, for example, by hand. The unit 20 is equipped with appropriate mechanism (not shown) for discharging the bottles in succession, one-by-one, through an outlet port 30 into a chute or conduit 32. The unit 20 may be, for example, of the type which utilizes a rotating cone or plate (not shown) to discharge the bottles in succession, under slight pressure, through the port 30. A typical version of the unit 20 is, for example, sold under the registered trademark CENTRIFEED by the firm Tangen Drives, Inc.

Figure 7:
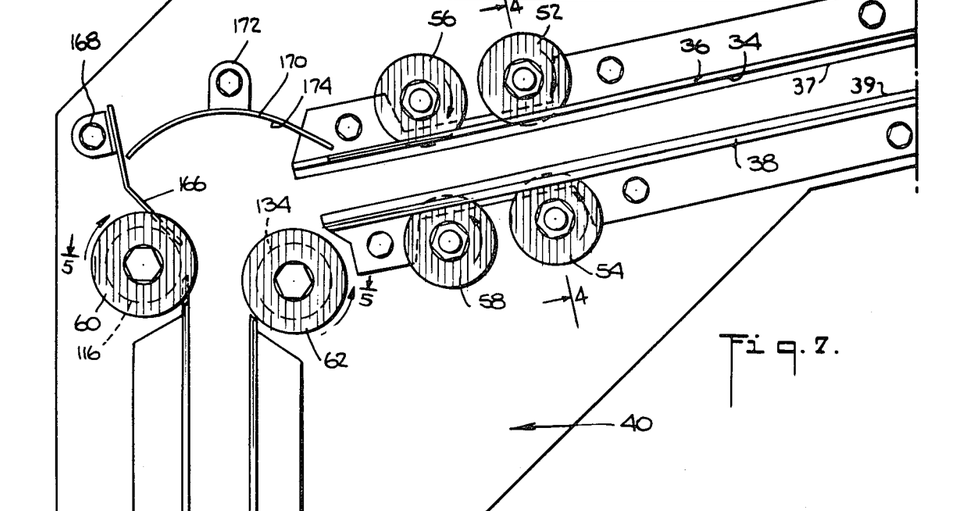
FIG. 7 is a fragmentary, front elevational view of the apparatus illustrated in FIG. 6.

Communicating with the chute 32 of the unit 20 is a chute 34 defined by an elongate upper member 36 and an elongate lower member 38. The members 36 and 38 are secured to one side face of a bracket 40 which is supported in upstanding relation upon a lower platform 42 of the frame portion 14. The conduits 32 and 34 have substantially the same dimensions and are adapted to guide the advancement of bottles discharged from the port 30 of the unit 20, such as the bottles 44, 46 and 48. The conduit 32 is closed on four sides, whereas the members 36 and 38 are provided with respective elongate lips 37,39 preferably running their full length up to the chute 32 (FIG. 7).

The bottles may be of the flexible variety and, at least insofar as the present invention is concerned, the bottles are of shoulder-and-neck construction having a thickness $t$ (FIG. 4) that is slightly less than the width W of the conduits or chutes 32 and 34. The bottles, therefore, are capable of sliding loosely along the chutes 32 and 34 as a train of randomly oriented bottles, each bottle pushing the next as a result of the force exerted by the unit 20 against the last of the bottles issuing from the port 30.

Associated with the chute 34 are two pairs of timing rollers; namely, a first pair of rollers 52 and 54, and a second pair of rollers 56 and 58. The timing rollers function to control the rate of advancement of the bottles outwardly of the chute 34 and into contact with still a third pair of rollers; namely the rollers 60 and 62. The rollers 60 and 62 function, in cooperation with one another, to alter the disposition of those bottles advanced along the chute 34 with a neck-leading disposition (such as the bottles 44 and 46) to a neck-trailing disposition (such as the bottle 48). The rollers 60 and 62 also cooperate with one another to accelerate each of the bottles they manipulate into a vertically oriented chute 64 defined by a pair of parallel, spaced members 66 and 68 also affixed to the upstanding bracket 40. The members 66 and 69 are spaced from one another by the distance T corresponding to the width W of the chute 34. For reference purposes herein, the roller 60 is hereinafter referred to as a "discriminating roller", whereas the roller 62 is hereinafter referred to as an "accelerating roller".

The rollers 52, 54, 56, 58, 60 and 62 are each provided with elastomeric bottle-contacting surfaces and are each rotatably journaled (in a manner as will be described below) in the upstanding bracket 40. The latter said rollers are also all driven by a common drive means 70 in the form of a conventional motor supported on and affixed to the platform 16. The aforementioned rollers are all coupled to a pulley assembly 69 including a toothed drive pulley 72 which in turn is driven by a toothed output pulley 74 of the motor 70. The pulleys 72 and 74 are coupled with one another by means of, for example, an endless toothed, positive drive belt 76. It will be understood that the upstanding bracket 40 is cut away along the irregular, generally U-shaped, line 78 for illustrative purposes in order to schematically expose the drive means 70 for viewing.

As each of the bottles are manipulated into a neck-trailing disposition by the rollers 60 and 62, they are permitted to fall one-by-one downwardly into and along the chute 64. The chute 64 guides each of the bottles into respective bottle-constraining spaces isolated from one another by means of equidistantly spaced spoke-like elements 71 (FIG. 2) extending radially outwardly from the periphery of a wheel 75 journaled upon the platform 42 (FIG. 1) adjacent to the chute 64. As illustrated in FIG. 1, the plate member 68 of the chute 64 terminates in close proximity to the platform 42, whereas the plate member 66 of the chute 64 terminates short of the platform 42 by a distance corresponding to the axial thickness of the wheel 75. As a result, the periphery of the wheel 75 can extend partially into the chute 64 beneath the lower end 73 of the plate member 66 so that the spoke-like elements 71 project into the chute 64 as shown.

As further illustrated in FIG. 1, the wheel 75 is mounted upon a shaft 77 which is freely journaled at its lower end in an appropriate bearing support 79. The bearing support 79 is attached to and rests upon a lower platform 80 of the lower frame portion 12. Affixed to the shaft 77, is a toothed pulley 82 which when rotated is adapted to transmit rotation to the shaft, the latter which in turn transmits rotation to the wheel 75. The pulley 82 is driven by a drive means 84 in the form of, for example, a motor having a toothed output drive pulley 86 coupled with the pulley 82 through the intermediary of an endless chain or band 88.

The drive means 84 is adapted to continually effect rotation of the output pulley 86. Thus, the pulley 82 and wheel 75 are continually rotated in unison at a rate such that the spaces between adjacent ones of the spoke-like elements are moved in succession across the chute 64 for receiving the descending bottles from the chute 64 and the rollers 60 and 62. The wheel 75, thus, withdraws the descending bottles from the chute 64, and moves the bottles horizontally along an arcuate path to a conveyor belt 92 illustrated in phantom in FIG. 2. The belt 92 moves in the direction of arrow A linearly substantially at the same rate at which the spoke-like elements 71 are rotated by the wheel 75, and is thus capable of extracting the bottles from between the spoke-like elements 71.

Figure 2:
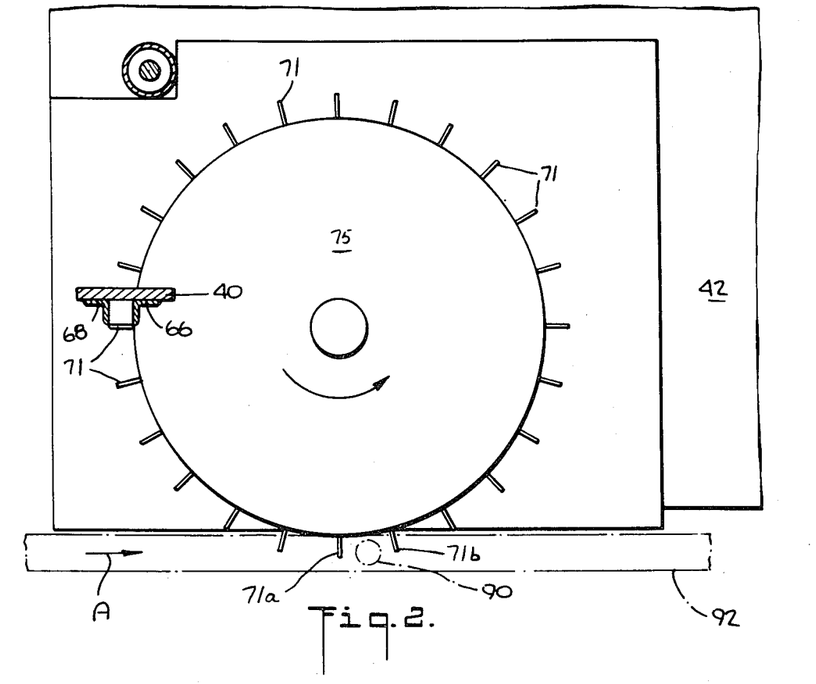
FIG. 2 is a fragmentary, plan view, taken in the direction of the line 2—2 in FIG. 1 of a portion of the assembly illustrated in FIG. 1.

In this respect, as illustrated in FIG. 2, a bottle 90 illustrated in phantom is disposed between the spoke-like elements 71a and 71b. When the bottle 90 reaches the position illustrated in FIG. 2, in the course of counterclockwise rotation of the wheel 75, the bottle 90 moves onto the conveyor belt 92. Once the bottle 90 rests upon the moving belt 92, continued movement of the belt 92 with the spoke-like elements 71a and 71b effects withdrawal of the bottle 90 for advancement to a processing station (not shown) where it can be filled or otherwise treated.

The Bottle Orienting Apparatus

Figure 3:
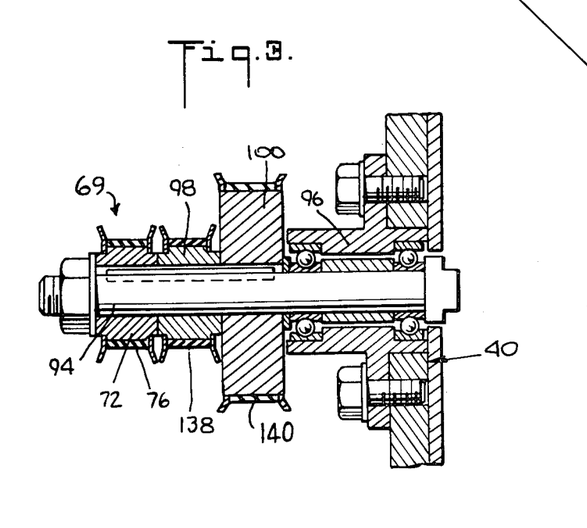
FIG. 3 is an enlarged cross-sectional view, taken along the line 3—3 in FIG. 1, of a portion of the apparatus pursuant to the present invention.

Referring now to FIG. 3, there is illustrated the details of construction of the pulley assembly 69 for rotating the timing rollers 52, 54, 56 and 58, and for likewise rotating the discriminating roller 60 and the accelerating roller 62. As shown, the drive pulley 72 of the pulley assembly 69 is affixed to a shaft 94 which in turn is journaled in a bearing assembly 96 supported by the frame portion 40. As a result, the drive pulley 72 and the shaft 94 are rotatable together relative to the frame portion 40. Affixed to and adapted to rotate with the drive pulley 72 and the shaft 94 is a pair of different sized toothed pulleys 98 and 100 which, by means of respective endless toothed belts or the like (as will be discussed below), transmit rotation to the timing rollers 52, 54, 56 and 58 and to the discriminating roller 60 and the accelerating roller 62.

Figure 4:
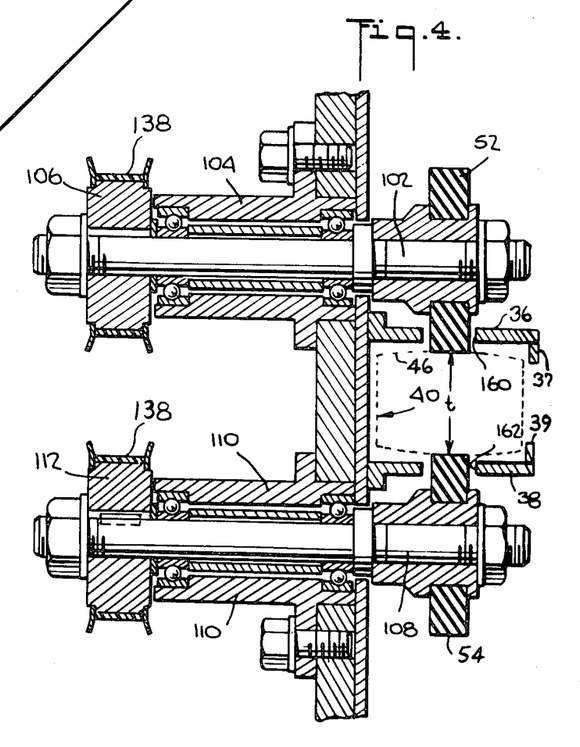
FIG. 4 is an enlarged cross-section view, taken along the line 4—4 in FIG. 7, of a portion of the apparatus pursuant to the present invention.

Illustrated in FIG. 4 is the mechanical drive arrangement for the timing rollers 52 and 54 which is identical to the mechanical drive arrangement (not shown) for the timing rollers 56 and 58. As shown, the roller 52 is affixed upon a shaft 102 which in turn is rotatably journaled in a bearing assembly 104 secured to the frame portion 40. At the opposite end of the shaft 102 is a toothed pulley 106 which is operatively associated with the pulley 98 (FIG. 2.) via an endless toothed band or the like. Similarly, the roller 54 is affixed to a shaft 108 rotatably journaled in a bearing assembly 110 secured to the frame portion 40. At the opposite end of the shaft 108 is a toothed pulley 112 which, like the pulley 106, is operatively associated with the pulley 98 via an endless toothed band or the like. It will be seen, that the respective peripheries of the rollers 52 and 54 (and likewise that of the rollers 56 and 58) are closer to one another than is the spacing W (FIG. 1) between the members 36 and 38. The rollers 52 and 54 (and likewise the rollers 56 and 58) are, thus, capable of engaging the opposite sides of the bottles advancing therebetween (FIG. 4).

Figure 5:
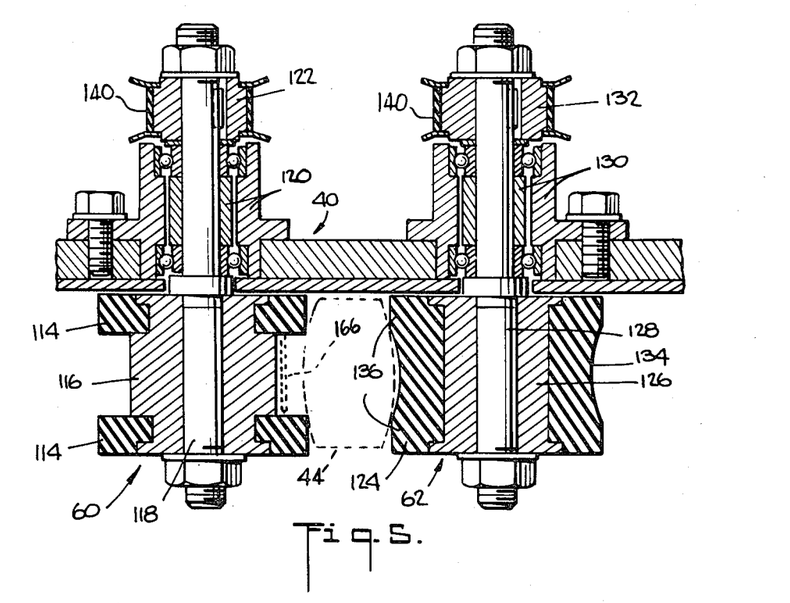
FIG. 5 is an enlarged cross-sectional view, taken along the line 5—5 in FIG. 7, of a portion of the apparatus pursuant to the present invention.

Referring now to FIG. 5, there is illustrated the relationship of the discriminating roller 60 with the accelerating roller 62. The discriminating roller 60 is in the form of a pair of axially spaced elastomeric cylindrical portions 114 affixed to a rigid (for example, metallic) cylindrical body 116 of reduced diameter. The body portion 116 is affixed to and adapted to rotate with a shaft 118 rotatably journaled in a bearing assembly 120 secured to the frame portion 40. At the opposite end of the shaft 118 is a toothed pulley 122 which is adapted to transmit rotation to the shaft 118 via an endless toothed band or the like driven (as will be described below) by the pulley 100 illustrated in FIG. 3.

The accelerating roller 62 includes an elastomeric outer annular portion 124 affixed to a rigid (for example, metallic) internal body portion 126. The internal body portion 126 is affixed to a shaft 128 rotatably journaled in a bearing assembly 130 secured to the frame portion 40. At the opposite end of the shaft 128 is a toothed pulley 132 which is adapted to transmit rotation to the shaft 128 via an endless toothed belt or the like driven (as will be described below) by the pulley 100 illustrated in FIG. 3.

Preferably, for purposes which will be clarified below, the diameter of the pulley 132 is slightly greater than the diameter of the pulley 122.

As shown, the outer portion 124 of the accelerating roller 62 is provided, preferably, with a converging-diverging medial region 134. The outer portion 124 of the accelerating roller 62 is also provided with a pair of axially opposite cylindrical regions 136 which are axially spaced from one another by a distance corresponding to the distance at which the portions 114 of the discriminating roller 60 are spaced from one another.

Figure 6:
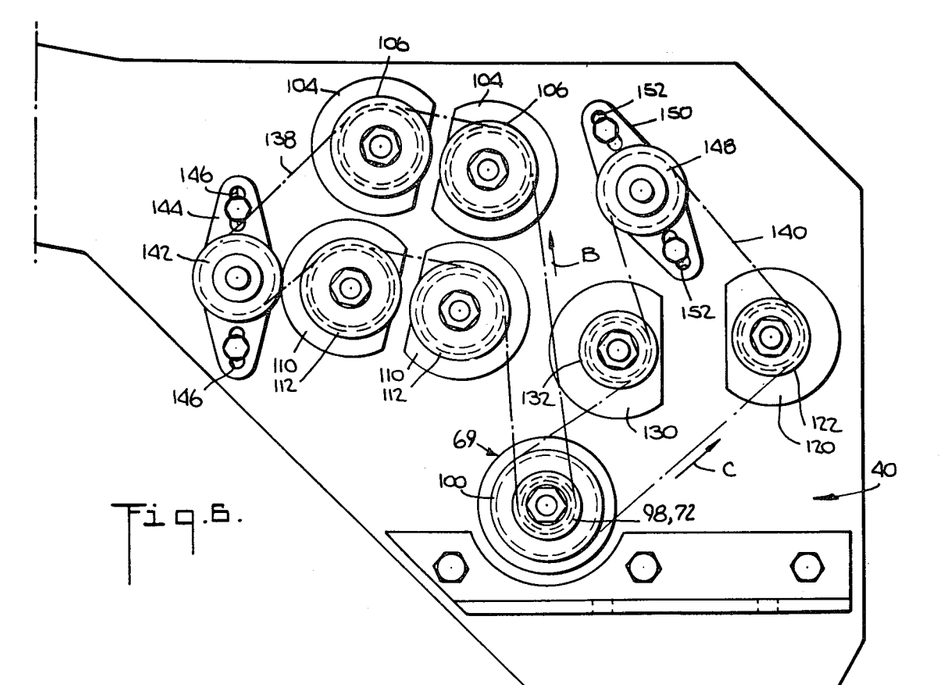
FIG. 6 is a fragmentary, rear elevational view of a portion of the apparatus pursuant to the present invention.

Referring now to FIG. 6, there is illustrated the operative association of the various pulleys with one another and with a pair of endless bands or belts denoted, respectively, by the reference characters 138 and 140. This association of parts exists on the side face of the frame portion 40 that is opposite of the side face thereof illustrated in FIG. 1. The endless belt 138 is operatively associated with the drive pulley 98 and with the driven pulleys 106 and 112 of the timing rollers 52 and 54, respectively (as well as of the timing rollers 56 and 58). The belt 138 is also operatively associated with a toothed tension control pulley 142 freely journaled on a bracket 144 having a pair of slotted openings 146 to provide for adjustability of the pulley 142 relative to the frame portion 40.

Similarly, the endless belt 140 is operatively associated with the drive pulley 100 and with the driven pulley 122 of the discriminating roller 60 and the pulley 132 of the accelerating roller 62. Also operatively associated with the endless belt 140 is a toothed tension controlling pulley 148 freely journaled on a bracket 150 having a pair of slotted openings 152 to provide for adjustability of the pulley 148 relative to the frame portion 40.

Although not shown, the belt 138 is provided with teeth on both of its opposite pulley-engaging faces to provide for positive drive of the various toothed pulleys it engages. The belt 140 likewise is provided with teeth (not shown) on both of its opposite pulley-engaging faces to provide for positive drive of the various toothed pulleys it engages.

As viewed in FIG. 6, the drive pulleys 98 and 100 together rotate counter-clockwise so that the belt 138 is driven in the direction of arrow B and the belt 140 is driven in the direction of arrow C. The upper run of the belt 138 is in contact with the pulleys 106 as shown and thereby transmits rotation to the latter pulleys in a counter-clockwise direction. The lower run of the belt 138 is in contact with the pulleys 112 as shown and, because of the return of the lower run of the belt 138 from the pulley 142 to the pulley 98, the pulleys 112 are caused to rotate in a clockwise direction.

Also as viewed in FIG. 6, the right-side run of the belt 140 is in contact with the right-side of the pulley 122 and thereby causes the latter to rotate in a counter-clockwise direction. However, the left-side run of the belt 140 is in contact with the right-side of the pulley 132 and, because of the return of the right-side of the belt 140 from the pulley 148 to pulley 100, the pulley 132 is caused to rotate in a clockwise direction.

Accordingly, the upper pulleys 106 of the timing rollers 52 and 56 rotate in an opposite direction from that of the lower pulleys 112 of the timing rollers 54 and 58. Similarly, the pulley 122 rotates in an opposite direction from that of the pulley 132.

Referring now to FIG. 7, there is illustrated on a scale corresponding to the scale of FIG. 6 the opposite side face of the frame portion 40. This view shows the association of the timing rollers 52, 54, 56 and 58, and of the discriminating roller 60 with the accelerating roller 62. The pulley-and-drive arrangement illustrated in FIG. 6 causes the rollers 52 and 56 (as viewed in FIG. 7) to rotate clockwise and the rollers 54 and 58 to rotate counter-clockwise. Similarly, the discriminating roller 60 is caused to rotate clockwise, whereas the accelerating roller 62 is caused to rotate counter-clockwise.

As further illustrated in FIG. 7 (and more particularly in FIG. 4), the timing rollers 52 and 56 project slightly through respective cut-outs 160 formed in the upper plate member 36, whereas the lower timing rollers 54 and 58 projecting slightly through respective cut-outs 162 formed in the lower plate member 38. As a result, the respective peripheries of the rollers 52 and 54 (and of the rollers 56 and 58) are engageable with bottles advancing under pressure offered by the supply unit 20 downwardly along the chute 34. Since the bottles have a thickness $t$ corresponding to (but slightly less than) the width of the chute 34, the rollers 52 and 54 (and the rollers 56 and 58) are adapted to slightly pinch the bottles advancing therebetween. Furthermore, the rollers 52 and 54 (and the rollers 56 and 58) are spaced from one another radially from periphery-to-periphery by a distance corresponding to the distance at which the discriminating roller 60 is radially spaced from the accelerating roller 62 periphery-to-periphery. As a result, the accelerating roller 62 cooperates with the discriminating roller 60 to pinch bottles advancing therebetween from the chute 34.

As further illustrated in FIG. 7 (and in phantom in FIG. 5), between the portions 114 of the discriminating roller 60, there is disposed a camming plate 166 which is affixed to a bracket 168 secured to the frame portion 40. Disposed between the camming plate 166 and the chute 34, is a curvilinear plate 170 affixed to a bracket 172, the latter which is also secured to the frame portion 40. The curvilinear plate 170 presents a concavity 174 confronting the rollers 60 and 62.

Operation of the Bottle Orienting Apparatus

Initially, the supply unit 20 is filled by hand with many bottles which in succession are discharged under pressure by the supply unit 20 through the port 30 as a train of bottles into the chutes 32 and 34 in communication with one another. During this period, the drive means 70 causes the drive pulley 72 to turn, thereby transmitting rotation to the timing rollers 52, 54, 56 and 58, and to the discriminating roller 60 and the accelerating roller 62. The timing rollers 52, 54, 56 and 58 act as a brake to the train of bottles advancing along the chute 34 and serve to feed the bottles one-by-one in a timed sequence to the rollers 60 and 62. The bottles are prevented from being dislodged from between the plate members 36 and 38 by the elongate lips 37 and 39 which, preferably, run the full length of the chute 34 up to the chute 32 (FIG. 7).

As shown in FIG. 6, the diameter of the drive pulley 100 is substantially twice the size of the diameter of the drive pulley 98 and, thus, the peripheral speed of the pulley 100 is substantially twice the peripheral speed of the pulley 98. Thus, the endless belt 140 associated with the drive pulley 100, and the pulleys 122 and 132 associated with the endless belt 140, are driven substantially twice as fast as is the belt 138 associated with the drive pulley 98 and the pulleys 106 and 112.

As a result, the discriminating roller 60 and the accelerating roller 62 are driven at a peripheral velocity which is greater than twice the peripheral velocity of the timing rollers 52, 54, 56 and 58, firstly because the belt 140 is driven at twice the rate that the belt 138 is driven and secondly because the diameter of the rollers 60 and 62 is greater than the diameter of the timing rollers 52, 54, 56 and 58. Accordingly, the bottles are advanced by the rollers 60 and 62 at more than twice the rate that they are advanced by the timing rollers. Thus, the bottles are said to be "accelerated" by the accelerating roller 62 and the discriminating roller 60.

The timing rollers 52, 54, 56 and 58 many, therefore, be said to function as a brake system for slowing down the rate of advancement of the bottles discharged into the chute 34 to provide sufficient time for the discriminating roller 60 and the camming plate 166 in cooperation with the accelerating roller 62 to invert those bottles of neck-leading disposition (such as the bottles 44 and 46 illustrated in FIG. 1) to ones of neck-trailing disposition (such as the bottle 48 illustrated in FIG. 1). Those bottles having a neck-leading disposition are inverted in the manner schematically illustrated in phantom in FIG. 1 wherein, for example, the bottle 44 is discharged by the timing rollers from the chute 34 to initially engage, with its neck, the camming plate 166 adjacent to discriminating roller 60. In this disposition of the bottle 44, the portion of the bottle 44 behind the shoulders and neck thereof rests on the accelerating roller 62 and is frictionally accelerated by the latter so that the neck slides upwardly along the camming plate 166 to the disposition shown in phantom and denoted by the reference character 44a.

Since the roller 62 only frictionally urges the bottle 44 forwardly, it is preferred that the roller 62 be assisted by a nozzle 180 (FIG. 1) having the capacity to inject a pressured fluid, such as air, against the bottom of each bottle on the accelerating roller 62. The fluid and the accelerating roller 62, therefore, cooperate with one another to accelerate each bottle of neck-leading disposition from the chute 34 and upwardly along the camming plate 166 to the disposition denoted by reference character 44a. The curvilinear plate 170 limits the extent of upward movement of the bottle 44, the concavity 174 allowing the bottle to be tilted into and beyond the disposition denoted by reference character 44a.

Continued rotation of the accelerating roller 62 causes the bottle 44 to be tilted as much as 90° beyond the disposition thereof denoted by reference character 44a, and then returned to a vertically oriented disposition with its neck up. The opposing rotational dispositions of the rollers 60 and 62 then become effective to "pinch" and accelerate the bottle 44 (now denoted by reference character 44b) vertically downwardly into the chute 64 for subsequent removal by the wheel 75.

As pointed out above, the pulley 132 associated with the accelerating roller 62 has a diameter which is slightly greater than the diameter of the pulley 122 associated with the discriminating roller 60. As a result, and since the pulleys 122 and 132 are driven by the same endless toothed band 140, the smaller pulley 122 will make more revolutions per unit of time than will the larger pulley 132. In turn, the discriminating roller 60 driven by the smaller pulley 122 will rotate more rapidly than will the accelerating roller 62 driven by the larger pulley 132.

Accordingly, the faster rotating discriminating roller 60 is more effective than the slower rotating accelerating roller 62 to frictionally tilt the lower sidewall portion of each bottle of neck-trailing disposition (as well as of each bottle tilted earlier as much as 90° beyond the disposition denoted by reference character 44a). As a result of such effectiveness of the discriminating roller 60, it causes the sidewall portion of each bottle coming in contact therewith to move more rapidly than the sidewall portion of each bottle coming in contact with the accelerating roller 62. Each bottle, therefore, is caused to tilt from a neck-trailing disposition to a vertical disposition in alignment with the chute 64 for injection into the latter.

It will be understood that the width of the neck of the bottle 44 (and for that matter of all of the bottles trailing the bottle 44) is slightly less than the axial spacing of the portions 114 of the discriminating roller 60. Thus, the neck of the bottle 44 is capable of engaging only the camming plate 166 disposed between the portions 114 of the discriminating roller 60 so that the bottle can be tilted into a neck-up disposition. The shoulder span (or body span) of each of the bottles, however, is greater than the spacing between the portions 114 of the discriminating roller 60. Thus, those bottles of neck-trailing disposition which arrive at the discriminating roller 60 do not engage the camming plate 166 and, therefore, are not inverted. Such bottles of neck-trailing disposition simply advance bottom-first between the rollers 60 and 62 whereupon they too are pinched and accelerated into the chute 64.

During the period in which a given bottle is being manipulated by the discriminating roller 60 and the accelerating roller 62, the slower turning timing rollers 52, 54, 56 and 58 hold back the trailing bottles (the bottles 46 and 48), but not for an excessive period. This is because the peripheries of the rollers 60 and 62 are moving at more than twice the rate of movement of the peripheries of the timing rollers. The rollers 60 and 62 are, therefore, capable of cooperating with one another to self-compensate for the delay arising out of their inverting those bottles requiring inversion, the compensation accruing from the "bottle-accelerating" capacity of the rollers 60 and 62.

The acceleration of each of the bottles manipulated by the rollers 60 and 62 is reliably insured because of the manner by which the rollers 60 and 62 cooperate with each other to "pinch" each bottle between their elastomeric surfaces. By pinching each bottle, the rollers 60 and 62 significantly minimize slippage between the bottles and the peripheries of the rollers and, as a result, exercise positive frictional control over each bottle when acceleration is initiated. The discriminating roller 60 and the accelerating roller 62, therefore, have the cooperating triumvirate roles of assisting one another to (a) accelerate each bottle from the chute 34, (b) invert those bottles requiring inversion, and (c) accelerate each bottle into the chute 64, thereby compensating for the time lost during the bottle-inverting periods.

It will be seen that the cylindrical portions 114 of the roller 60 cooperate with the cylindrical portions 136 of the roller 62 to squeeze each bottle. It will also be seen that the converging-diverging portion 134 of the roller 62 constrains each bottle against movement laterally of the direction of bottle advancement, and thus, cooperates with the body portion 116 of the roller 60 to invert those bottles requiring inversion.

After the bottles are accelerated into the chute 64, they are in succession removed from the chute 64 by the wheel 75 which in cooperation with, for example, the conveyor belt 92 (FIG. 2) advances the bottles to other apparatus (not shown) at which the bottles may be treated or filled, and packaged or stored.

Clutch System for the Accelerating and Discriminating Rollers

Figure 8:
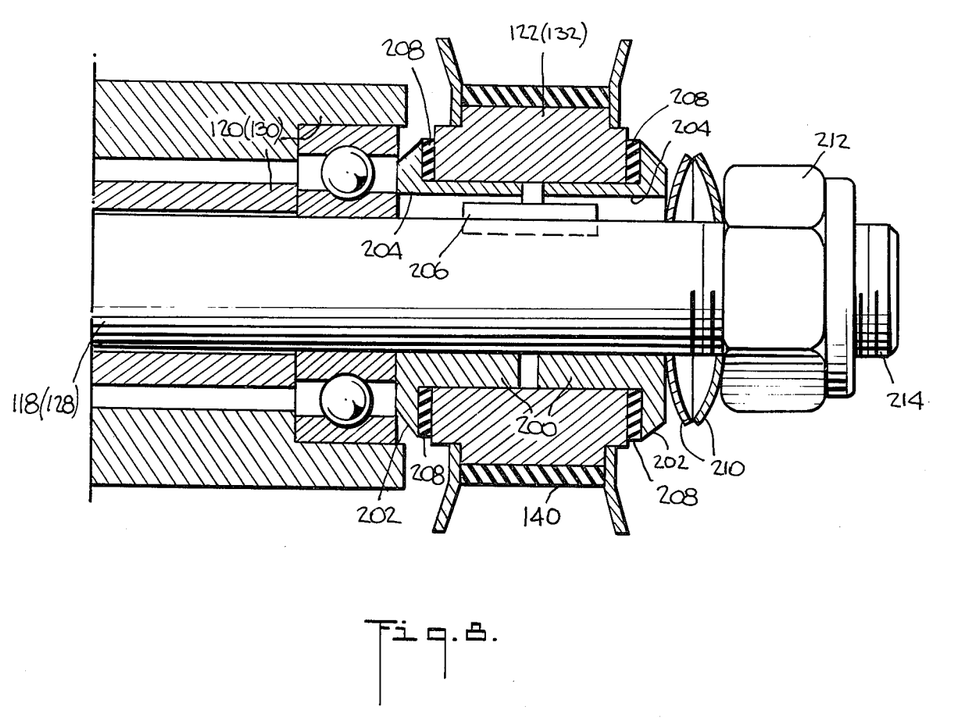
FIG. 8 is a fragmentary, cross-sectional view of a preferred clutch system of the present invention.

Referring now to FIG. 8, there is illustrated a preferred manner by which the pulley 122 (associated with the discriminating roller 60) and the pulley 132 (associated with the accelerating roller 62) are mounted on their respective shafts 118 and 128 so as to rotatably slip relative to such shafts under prescribed conditions that will be clarified below.

The pulley 122 (132), as was described above, is arranged on the shaft 118 (128), the latter of which is rotatably journaled in the frame portion 40 via the bearing assembly 120 (130). Concentrically arranged on the shaft 118 (128) is a pair of half bushings 200, each of which includes an annular flange 202. The bushings 200 are each provided with an axially directed slot 204 for receiving the upper half of a key member 206. The lower half of the key member 206 is confined in a conforming slot provided in the shaft 118 (128). The key member 206 has a slideable fit with respect to groove 204. Accordingly it prevents the half bushings 200 from turning relative to the shaft 118 (128), and yet allows such bushings to be adjusted axially relative to one another, closer to or further from one another.

Surrounding the bushings 200 is the pulley 122 (132). Interposed between each of the opposite ends of the pulley 122 (132) and a corresponding one of the flanges 202 of the bushings 200 is a respective annular fiber disc 208 made of a conventional low-friction-coefficient material, such as a pressed phenolic paper or a plastic impregnated with a phenolic resin, e.g. manufactured under the trademarks "RYERTEX" and "TEXTELITE". The pulley 122 (132) is, thus, capable of turning relative to the half bushings 200 when a force is applied to it that is in excess of the axial friction force applied to the opposite ends thereof via the fiber discs 208 and the flanges 202 of the bushings 200.

The axial friction force aforementioned is governed by a pair of Belville spring members 210 whose concavities confront one another and whose peripheries are axially engaged with one another. Such spring members 210 are concentrically mounted on the shaft 118 (128) between the endmost bushing 200 and a threadedly adjustable member, such as the nut 212, arranged on the threaded end 214 of the shaft 118 (128). By tightening the nut 212, the Belville spring members 210 are caused to press against each other, and thus against the bushings 200, with a greater force. As a result, the frictional force exerted by the fiber discs 208 axially against pulley 122 (132) is increased or decreased as a function of the tightness of the nut 212.

More significantly, the pulley 122 (132) is allowed to slip frictionally relative to the shaft 118 (128) when, for example, the discriminating roller 60 or the accelerating roller 62 must turn more slowly than the other to properly orient a given bottle and force the latter into the chute 64. More particularly, when a bottle of neck-leading disposition (the bottle 44) engages with its neck the discriminating roller 60, it is necessary for the accelerating roller 62 to turn more rapidly than the discriminating roller 60 to tilt the bottle into a disposition denoted by reference character 44a, and thence vertically, so that the bottle can be subsequently squeezed between the rollers 60 and 62 and forced into the chute 64. As the bottle is tilted, the frictional force exerted by the bottle wall against the discriminating roller 60 is opposite of the direction that the roller 60 is turned by the shaft 118 via the belt 140. As a result, the rate of rotation of the discriminating roller 60 is slowed. The slowing down of the roller 60 is permitted because the pulley 122 associated therewith can slip relative to the shaft 118.

Similarly, when a bottle of neck-trailing disposition (the bottle 48) engages with its bottom the discriminating roller 60, the latter must turn more rapidly than the accelerating roller 62 to properly tilt such a bottle into a vertical disposition whereby it can be squeezed and forced into the chute 64. In this regard, the wall of the bottle frictionally resists the rotation of the accelerating roller 62 causing the latter to slow its rotation. Such a slow-down of the roller 62 is permitted because the pulley 132 associated therewith can slip relative to the shaft 128.

In summary, therefore, the bushings 200 and the fiber discs 208 in interposition between the shaft 118 (128) and the pulley 122 (132) function as a frictional clutch system that is manually adjustable to allow the discriminating roller 60 and the accelerating roller 62 to self adjust their respective rates of rotation depending upon the neck-leading or neck-trailing disposition of a given bottle.

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. Bottle orienting apparatus comprising guide means for receiving and advancing bottles of shoulder-and-neck construction in random neck-leading and neck-trailing dispositions, discriminating means for distinguishing bottles of neck-leading disposition from bottles of neck-trailing disposition and altering at a bottle-inverting location the disposition of each of the neck-leading bottles to respective neck-trailing dispositions, and guide means being upstream of and communicating with said discriminating means, and accelerating means cooperative with said discriminating means for accelerating away from said discriminating means bottles which have arrived at the discriminating means in neck-trailing disposition and bottles which have been altered by the discriminating means from a neck-leading to a neck-trailing disposition, said accelerating means and said discriminating means together forming a pinching means downstream of said bottle-inverting location for squeezing said bottles laterally of the direction of bottle-acceleration to exercise positive frictional control over said bottles when initiating the acceleration of the latter.

2. Bottle orienting apparatus as claimed in claim 1, wherein said discriminating means includes roller means with which said bottles are engageable, said roller means including a pair of axially spaced cylinders and a transition cylinder of reduced diameter bridging said pair of cylinders, said transition cylinder having an axial extent which is in excess of the lateral extent of the neck of any of said bottles but which is less than the combined lateral extent of the shoulders of any of said bottles.

3. Bottle orienting apparatus as claimed in claim 2, wherein said discriminating means further includes camming means with which the neck of each of the neck-leading bottles is engageable for tilting the latter said bottles from their respective neck-leading dispositions to respective neck-trailing dispositions.

4. Bottle orienting apparatus comprising guide means for receiving and advancing bottles of shoulder-and-neck construction in random neck-leading and neck-trailing dispositions, discriminating means for distinguishing bottles of neck-leading disposition from bottles of neck-trailing disposition and altering the disposition of each of the neck-leading bottles to respective neck-trailing dispositions, said guide means being upstream of and communicating with said discriminating means, said discriminating means including roller means with which said bottles are engageable, said roller means including a pair of axially spaced cylinders and a transition cylinder of reduced diameter bridging said pair of cylinders, said transition cylinder having an axial extent which is in excess of the lateral extent of the neck of any of said bottles but which is less than the combined lateral extent of the shoulders of any of said bottles, said discriminating means further including camming means with which the neck of each of the neck-leading bottles is engageable for tilting the latter said bottles from their respective neck-leading dispositions to respective neck-trailing dispositions, said camming means including a plate seated between said pair of cylinders and slightly upstream of said transition cylinder, and accelerating means for accelerating said bottles away from said discriminating means, said accelerating means including pinching means for squeezing said bottles laterally of the direction of bottle-acceleration to exercise positive frictional control over said bottles when initiating the acceleration of the latter.

5. Bottle orienting apparatus as claimed in claim 4, including arcuate plate means for limiting the extent of advancement of the bottles of neck-leading disposition as the latter are tilted into respective neck-trailing dispositions, said arcuate plate means presenting a concavity confronting said discriminating means and having an end which is adjacent to said plate of said camming means.

6. Bottle orienting apparatus as claimed in claim 1, wherein said pinching means includes movable surface means spaced from said discriminating means by a distance which is less than the thickness of any of said bottles.

7. Bottle orienting apparatus as claimed in claim 6, wherein said movable surface means includes a roller having a converging-diverging midsection for engaging said bottles and constraining the latter against movement laterally of their direction of acceleration.

8. Bottle orienting means as claimed in claim 7, wherein said discriminating means at least in part includes a roller engageable with said bottles, said roller of said movable surface means and said roller of said discriminating means including respective elastomeric portions cooperating with each other to constitute at least in part said pinching means, and including means for rotating each of said rollers in opposite rotary directions to frictionally accelerate each of said bottles successively pinched therebetween.

9. Bottle orienting apparatus as claimed in claim 1, wherein said guide means includes a pair of opposed elongate plates each having at least one cut-out formed therein opposite the cut-out in the other, and a pair of rollers each of which is rotatably supported adjacent to a corresponding one of said plates and having respective peripheries projecting at least partially through a corresponding one of said cut-outs for engaging and frictionally advancing said bottles toward said discriminating means.

10. Bottle orienting apparatus as claimed in claim 9, including positive drive means for driving said rollers in opposite rotary directions at a peripheral speed which advances each of said bottles at a rate allowing sufficient time for said discriminating means to alter the disposition of a given one of said bottles from a neck-leading disposition to a neck-trailing disposition.

11. Bottle orienting apparatus as claimed in claim 10, including means for injecting a pressurized fluid against said bottles to advance the latter from said guide means to said discriminating means and assist in altering the disposition of the neck-leading bottles to neck-trailing bottles.

12. Bottle orienting apparatus comprising guide means for receiving and advancing bottles of shoulder-and-neck construction in random neck-leading and neck-trailing dispositions; discriminating means for distinguishing bottles of neck-leading disposition from bottles of neck-trailing disposition and altering the disposition of each of the neck-leading bottles to respective neck-trailing dispositions, said guide means being upstream of and communicating with said discriminating means, said guide means including a pair of opposed elongate plates each having at least one cut-out formed therein opposite the cut-out in the other, said guide means further including a pair of rollers each of which is rotatably supported adjacent to a corresponding one of said plates and having respective peripheries projecting at least partially through a corresponding one of said cut-outs for engaging and frictionally advancing said bottles toward said discriminating means; positive drive means for driving said rollers in opposite rotary directions at a peripheral speed which advances each of said bottles at a rate allowing sufficient time for said discriminating means to alter the disposition of a given one of said bottles from a neck-leading disposition to a neck-trailing disposition; means for injecting a pressurized fluid against said bottles to advance the latter from said guide means to said discriminating means and assist in altering the disposition of the neck-leading bottles to neck-trailing bottles, said discriminating means including camming means for tilting said bottles of neck-leading disposition, said means for injecting a pressurized fluid against said bottles having the capacity to inject such fluid at a sufficient pressure to urge said bottles of neck-leading disposition along said camming means; and accelerating means for accelerating said bottles away from said discriminating means, said accelerating means including pinching means for squeezing said bottles laterally of the direction of bottle-acceleration to exercise positive frictional control over said bottles when initiating the acceleration of the latter.

13. Bottle orienting apparatus as claimed in claim 1, including means for randomly feeding said bottles in succession to said guide means in neck-leading and neck-trailing dispositions.

14. Bottle orienting apparatus as claimed in claim 13, including means for collecting said bottles in succession from said accelerating means.

15. Bottle orienting apparatus comprising guide means for receiving and advancing bottles of shoulder-and-neck construction in random neck-leading and neck-trailing dispositions, discriminating means including a roller for distinguishing bottles of neck-leading disposition from bottles of neck-trailing disposition and altering at a bottle-inverting location the disposition of each of the neck-leading bottles to respective neck-trailing dispositions, said guide means being upstream of and communicating with said discriminating means, and accelerating means including a roller for accelerating said bottles away from said discriminating means, said accelerating means roller and said discriminating means roller being spaced from one another by a distance only slightly less than the thickness of any of said bottles and cooperating with one another to form a pinching means downstream of said bottle-inverting location to frictionally engage and accelerate away from said bottle-inverting location of said discriminating means in succession bottles which have arrived at said bottle-inverting location in neck-trailing disposition and bottles which have been altered by the discriminating means from a neck-leading to a neck-trailing disposition.

16. Bottle orienting apparatus comprising guide means for receiving and advancing bottles of shoulder-and-neck construction in random neck-leading and neck-trailing dispositions, said guide means including at least one pair of rollers having respective elastomeric peripheries which are frictionally engageable with said bottles, discriminating means including a roller for distinguishing bottles of neck-leading disposition from bottles of neck-trailing disposition and altering the disposition of each of the neck-leading bottles to respective neck-trailing dispositions, said guide means being upstream of and communicating with said discriminating means, accelerating means including a roller for accelerating said bottles away from said discriminating means, said accelerating means roller and said discriminating means roller being spaced from one another by a distance only slightly less than the thickness of any of said bottles and cooperating with one another to frictionally engage and accelerate away from said discriminating means in succession bottles which have arrived at the discriminating means in neck-trailing disposition and bottles which have been altered by the discriminating means from a neck-leading to a neck-trailing disposition, and drive means for rotating said rollers of said discriminating means, said accelerating means and said guide means, said drive means including a pair of different sized toothed pulleys and a pair of endless toothed belts, said rollers of said discriminating means, said accelerating means and said guide means each including a respective toothed pulley, the larger one of said pulleys of said drive means and one of the belts of the latter said means being operatively associated in positive driving engagement with said pulleys of said discriminating means and said accelerating means, the smaller one of said pulleys of said drive means and the other one of the belts of the latter said means being operatively associated in positive driving engagement with said pulleys of said guide means, whereby the pulleys of said guide means and their corresponding rollers rotate more slowly than the respective pulleys and their corresponding rollers of said discriminating means and said accelerating means.

17. Bottle orienting apparatus comprising guide means including first roller means positioned adjacent the downstream end thereof for receiving and advancing at a controlled velocity bottles of shoulder-and-neck construction in random neck-leading and neck-trailing dispositions, discriminating means positioned downstream of said roller means for distinguishing bottles of neck-leading disposition from bottles of neck-trailing disposition and altering the disposition of each of the neck-leading bottles to respective neck-trailing dispositions, and accelerating means interposed between said guide means and said discriminating means and including second roller means cooperative with said bottles for accelerating said bottles one-by-one from said guide means to said discriminating means at a greater velocity than the velocity at which said bottles are advanced by said guide means.

18. Bottle orienting apparatus as claimed in claim 17, wherein said first roller means serves as a timing means for controlling the velocity of said bottles to said accelerating means.

19. Bottle orienting apparatus as claimed in claim 18, wherein said first roller means includes at least one roller having a periphery which is frictionally engageable with said bottles, and further including drive means for rotating said roller at a peripheral velocity which is less than the velocity at which said bottles are advanced to said roller.

20. Bottle orienting apparatus as claimed in claim 19, wherein said first roller means also includes a second roller operatively associated with said drive means and spaced radially from the said first roller by a distance slightly less than the thickness of any of said bottles, said rollers cooperating with one another to pinch said bottles advancing therebetween one-by-one in succession.

21. Bottle orienting apparatus comprising guide means for receiving and advancing at a controlled velocity bottles of shoulder-and-neck construction in random neck-leading and neck-trailing dispositions, discriminating means for distinguishing bottles of neck-leading disposition from bottles of neck-trailing disposition and altering the disposition of each of the neck-leading bottles to respective neck-trailing dispositions, accelerating means interposed between said guide means and said discriminating means for accelerating said bottles one-by-one from said guide means to said discriminating means at a greater velocity than the velocity at which said bottles are advanced by said guide means, said discriminating means including a roller and said accelerating means including a roller, said discriminating means roller being positioned downstream of said accelerating means roller and being radially spaced therefrom a distance such that the respective peripheries of said rollers are cooperatively capable of pinching each of said bottles in succession, and further including drive means for rotating said rollers in opposite rotary directions, and clutch means interposed between said drive means and each of said rollers for permitting each of said rollers to slip relative to said drive means substantially one at a time in response to the neck-leading or neck-trailing disposition of a given bottle manipulated by said rollers, whereby when said rollers are in the course of manipulating a bottle of neck-leading disposition said roller of said discriminating means slips to the substantial exclusion of the roller of said accelerating means and when said rollers are in the course of manipulating a bottle of neck-trailing disposition said roller of said accelerating means slips to the substantial exclusion of the roller of said discriminating means.

22. Bottle orienting apparatus as claimed in claim 21, wherein said drive means includes a shaft, bearing means supporting said shaft for rotation, and pulley means mounted concentrically on said shaft for transmitting rotation to the latter, said clutch means including bushing means circumferentially interposed between said pulley means and shaft, said bushing means including a pair of flange means annularly embracing the axial opposite ends of said pulley means, low coefficient-of-friction means axially interposed between each of said flange means and a corresponding one of said opposite ends of said pulley means, said bushing means being lengthwise adjustable axially of said pulley means such that said flange means through the intermediary of said low coefficient-of-friction means is capable of exerting a selected friction force axially against said pulley means, spring means mounted on said shaft for exerting a resilient force axially against said bushing means tending to reduce the axial length of the latter such that said flange means squeezes said low coefficient-of-friction means against said pulley means, and adjustable means mounted on said shaft for urging said spring means with an adjustably prescribed force against said bushing means.

23. Bottle orienting apparatus comprising guide means for receiving and advancing at a controlled velocity bottles of shoulder-and-neck construction in random neck-leading and neck-trailing dispositions, discriminating means for distinguishing bottles of neck-leading disposition from bottles of neck-trailing disposition and altering the disposition of each of the neck-leading bottles to respective neck-trailing dispositions, accelerating means interposed between said guide means and said discriminating means for accelerating said bottles one-by-one from said guide means to said discriminating means at a greater velocity than the velocity at which said bottles are advanced by said guide means, said discriminating means including a roller and said accelerating means including a roller, said discriminating means roller being positioned downstream of said accelerating means roller and being radially spaced therefrom a distance such that the respective peripheries of said rollers are cooperatively capable of pinching each of said bottles in succession, and further including drive means for rotating said rollers one faster than the other in opposite rotary directions, and clutch means interposed between said drive means and the one said roller that rotates faster than the other, said clutch means permitting the faster rotating roller to slip relative to said drive means and adjust to the rate of rotation of the other of said rollers when said rollers are in the course of pinching a given one of said bottles.

24. Bottle orienting apparatus comprising guide means for receiving and advancing at a controlled velocity bottles of shoulder-and-neck construction in random neck-leading and neck-trailing dispositions, discriminating means for distinguishing bottles of neck-leading disposition from bottles of neck-trailing disposition and altering the disposition of each of the neck-leading bottles to respective neck-trailing dispositions, accelerating means interposed between said guide means and said discriminating means for accelerating said bottles one-by-one from said guide means to said discriminating means at a greater velocity than the velocity at which said bottles are advanced by said guide means, said discriminating means including a roller and said accelerating means including a roller, said discriminating means roller being positioned downstream of said accelerating means roller and being radially spaced therefrom a distance such that the respective peripheries of said rollers are cooperatively capable of pinching each of said bottles in succession, said discriminating means rollers and said accelerating means roller together constituting a second accelerating means downstream of said discriminating means for accelerating away from said discriminating means bottles which have arrived at the discriminating means in neck-trailing disposition and bottles which have been altered by the discriminating means from a neck-leading to a neck-trailing disposition.

* * * * *

UNITED STATES PATENT AND TRADEMARK OFFICE
CERTIFICATE OF CORRECTION

PATENT NO. : 4,095,688
DATED : June 20, 1978
INVENTOR(S) : Cristina S. Ionescu

It is certified that error appears in the above-identified patent and that said Letters Patent are hereby corrected as shown below:

Column 4, line 20, the numeral "69" should read --68--.

Column 8, line 40, the word "many" should read --may--.

Column 12, line 5, the word "and" (first occurrence) should read --said--.

Signed and Sealed this

Second Day of January 1979

[SEAL]

Attest:

RUTH C. MASON
Attesting Officer

DONALD W. BANNER
Commissioner of Patents and Trademarks